US012488668B2

(12) United States Patent
Burgess

(10) Patent No.: US 12,488,668 B2
(45) Date of Patent: Dec. 2, 2025

(54) WEARABLE SAFETY DEVICE

(71) Applicant: Kim Burgess, London (GB)

(72) Inventor: Kim Burgess, London (GB)

( * ) Notice: Subject to any disclaimer, the term of this patent is extended or adjusted under 35 U.S.C. 154(b) by 0 days.

(21) Appl. No.: 17/961,590

(22) Filed: Oct. 7, 2022

(65) Prior Publication Data

US 2023/0177939 A1 Jun. 8, 2023

(30) Foreign Application Priority Data

Oct. 8, 2021 (GB) ...................................... 2114442

(51) Int. Cl.

*G08B 17/00* (2006.01)
*G08B 21/02* (2006.01)
*G08B 7/00* (2006.01)

(52) U.S. Cl.

CPC ................ *G08B 21/02* (2013.01); *G08B 7/00* (2013.01)

(58) Field of Classification Search

USPC .... 340/532, 539.13, 539.14, 539.32, 539.17, 340/539.22, 566, 555, 571, 582, 683, 661, 340/693.3

See application file for complete search history.

(56) References Cited

U.S. PATENT DOCUMENTS

| | | | | |
|---|---|---|---|---|
| 5,092,607 | A * | 3/1992 | Ramsay | F41J 5/056 273/372 |
| 9,697,721 | B1 * | 7/2017 | Akuoku | G08B 15/00 |
| 10,123,603 | B1 * | 11/2018 | Glickman | A45C 5/03 |
| 10,997,417 | B2 * | 5/2021 | Birch | H04N 23/90 |
| 12,027,033 | B2 * | 7/2024 | Geyer | H04N 7/04 |
| 2010/0081411 | A1 * | 4/2010 | Montenero | G01N 33/0075 455/404.2 |
| 2015/0048530 | A1 * | 2/2015 | Cheung | A61M 16/024 261/135 |
| 2019/0387832 | A1 * | 12/2019 | Andon | A43B 3/36 |
| 2022/0214469 | A1 * | 7/2022 | Rossi | G01V 3/08 |

FOREIGN PATENT DOCUMENTS

| | | |
|---|---|---|
| EP | 0086651 | 8/1983 |
| WO | WO 2019/232475 | 12/2019 |
| WO | WO 2020/175770 | 9/2020 |

OTHER PUBLICATIONS

European Search Report and the European Search Opinion Dated Feb. 20, 2023 From the European Patent Office Re. Application No. 22200421.0. (9 Pages).

* cited by examiner

*Primary Examiner* — Daniel Previl

(57) ABSTRACT

The present invention relates to a wearable safety device 99 comprising: a device body 1 adapted to be secured to a user; a local alert system comprising at least one light source 65 and an audible alarm 35; an electronic control unit 51 comprising an alarm trigger and being configured to control the local alert system, wherein the electronic control unit is configured to continuously or repeatedly activate the light source to provide a visual alert, and wherein the electronic control unit is configured, upon actuation of the alarm trigger, to activate the audible alarm. The present invention also relates to a system comprising: a wearable safety device as aforementioned; and a software application for a user device, preferably a smartphone, wherein the software application is configured to broadcast an alert signal: based on a comparison between a planned route input by a user to the software application and data relating to the location of the user device; and/or upon actuation of the alarm trigger.

20 Claims, 7 Drawing Sheets

WEARABLE SAFETY DEVICE

RELATED APPLICATION

This application claims the benefit of priority of United Kingdom Patent Application No. 2114442.3 filed on Oct. 8, 2021, the contents of which are incorporated by reference as if fully set forth herein in their entirety.

FIELD AND BACKGROUND OF THE INVENTION

The present invention relates to a safety device, in particular a safety armband providing a means of deterring would-be attackers, as well as a means of alerting others to attacks.

Many people increasingly enjoy jogging or running. These runners may choose standard running routes, which they often run.

However, this can be dangerous in many instances, for example when running in poorly lit or sparsely populated areas, where attackers may lurk.

While existing alarms may provide a means of alerting others nearby to an attack, they do not prevent an attack from occurring in the first place and are ineffective if the attack does not occur near other people. Many runners may therefore seek a deterrence for attackers, and/or a means of allowing others to know of an attack.

The present invention arose in order to overcome problems suffered by existing devices.

SUMMARY OF THE INVENTION

According to an aspect of the present invention, there is provided a wearable safety device comprising: a device body adapted to be secured to a user; a local alert system comprising at least one light source and an audible alarm; an electronic control unit comprising an alarm trigger and being configured to control the local alert system, wherein the electronic control unit is configured to continuously or repeatedly activate the light source to provide a visual alert, and wherein the electronic control unit is configured, upon actuation of the alarm trigger, to activate the audible alarm.

The repeated activation of the light source (i.e. flashing) or continuous activation of the light source (i.e. a steady continuous light) provides a visual alert, for example by illuminating an alert signal, such as a word or symbol, on the device body. In this way, the device provides a visual deterrent against would-be attackers thus improving the safety of the user. The alert signal is preferably located on the outer face of the device body such that when the device is worn by a user the alert signal is directed towards and visible by others around the user. The audible alarm being activated upon actuation of the alarm trigger enables a user to trigger the alarm if they encounter a threat; the audible alarm will then alert others nearby to the threat. Therefore, the device provides a means for deterring would-be attackers before an attack takes place, as well as providing a means for ending an attack that does take place.

Preferably, the electronic control unit is further configured to broadcast an alert signal, preferably to predefined contacts, via transceiver means upon actuation of the alarm trigger. The alert is preferably sent to a number of predefined contacts, for example via a Short Message Service (SMS) text message to a set of mobile phone numbers. This alerts others to the threat even if they are remote from the user.

Preferably, the electronic control unit is configured to transmit and receive global positioning location data to and from a remote receiver, the data relating to the location of the safety device. Such location data can be used to compare the actual location of the user to a planned location or route, and/or can be transmitted to predefined contacts upon actuation of the alarm trigger to show those contacts the location of the user who has encountered a threat.

Preferably, the electronic control unit is configured to compare the data relating to the location of the safety device to data relating to a planned route, and to broadcast an alert signal via transceiver means, and optionally to activate the audible alarm, based on the comparison. Preferably the user inputs a route into a software application, and the software application continuously, or at intervals, compares the actual location of the device (and thus the user) against the planned route during use of the device to determine whether or not the user has deviated from the planned route, such as might be indicative of an attack.

Preferably, the alarm trigger comprises a vibration sensor. A vibration sensor provides an effective alarm trigger because it can be actuated by the user with ease, even during a panic, simply by hitting the device.

Preferably, the vibration sensor is calibrated such that the alarm trigger is actuated when a detected vibration exceeds a threshold value. In this way, the alarm trigger will not be inadvertently actuated by, for example, a user's running motion or the user's arm impacting on their body. Instead, the alarm trigger will be actuated by a user hitting the device. In this way, a user can actuate the alarm with ease, even during a panic, particularly as compared to a device which might for example have a small button which is difficult to press in a panic.

Preferably, the vibration sensor extends along a length of the device body. Preferably, the vibration sensor extends along a majoring of the length of the device body. This provides an extended area that the user can hit to actuate the alarm trigger. This makes it yet easier for the user to activate the alarm when needed, even in a panic, by providing a large area that they can hit on the device to activate the alarm.

Preferably, the wearable safety device further comprises connections through the device body adapted to transmit vibrations to the vibration sensor. The connections carry vibrations throughout the device in use, from the area on the device which a user hits to the vibration sensor which will detect the vibrations. In this way, the user does not need to worry about where on the device they hit the device as the vibration will detect the hit regardless; this makes the alarm yet easier for the user to reliably activate in a panic.

Preferably, the wearable safety device further comprises a diffuser panel, wherein the light source is configured to illuminate the diffuser panel from beside the diffuser panel. The light source is preferably one or more light emitting diodes. The light source is preferably located adjacent the diffuser panel and edge-on to the diffuser panel so that the light from the light source penetrates into the diffuser panel. The light is diffused within the panel such that the panel is evenly illuminated across its extent and thus provides for a uniformly lit visual alert.

Preferably, wherein the diffuser panel is a silicone panel. Silicone material evenly diffuses light through the panel such that the panel provides for a uniformly lit visual alert. Silicone is also flexible so that when the device is wrapped around a user's limb the silicone bends with the device.

Preferably, the at least one light source is adapted to illuminate a warning signal on the armband to provide the visual alert. Preferably, the warning signal is a word, a symbol, or lettering on the device body which is illuminated, such as back-lit, by the diffuser panel. This illuminated warning signal provides a visual deterrent to prevent attacks.

Preferably, the device body comprises an outer sleeve, and wherein the at least one light source is located within the outer sleeve and adapted to provide illumination through the outer sleeve.

Preferably, the diffuser panel and at least one light source are located within the outer sleeve so that the illuminated diffuser panel provides illumination through the outer sleeve. In this way, the outer sleeve protects the light source (and optionally the diffuser panel located within the outer sleeve) against the elements.

Preferably, the outer sleeve comprises cut-out or transparent portions, optionally forming lettering, the at least one light source being adapted to back-light the cut-out or transparent portions. The diffuser panel, located within the outer sleeve, thus sits behind the lettering so that light passes through the transparent or cut-out portions, while the outer sleeve blocks the remaining light, to provide an illuminated word or message via the lettering.

Preferably, the wearable safety device comprises a securement means for securing the device body to a user, the securement means comprising at least two cooperating securement parts adapted to be connected together. The securement means thus secures the device to a body in use so that it stays secured to the user when they are out exercising, for example, while wearing the safety device.

Preferably, the electronic control unit is configured to detect disconnection of the at least two securement parts, and to broadcast an alert signal via transceiver means, and optionally to activate the audible alarm, upon detection of the disconnection. In this way, if the device is removed from the user by an attacker, the alarm will be activated.

Preferably, the electronic control unit is configured to detect connection of the at least two securement parts, and to activate the at least one light source upon detection of the connection. In this way, once the device is secured to the user and being worn, the visual alert is displayed immediately to warn would-be attacker that the device is armed thereby to deter an attack.

Preferably, the securement means comprises an electrical contact between the at least two securement parts, and wherein the electronic control unit is configured to detect connection or disconnection of the at least two securement parts by monitoring the electrical contact. The electrical contact acts as a switch to either make or break a circuit connection which controls activation of the alarm.

Preferably, at least one of the cooperating securement parts extends along a length of the device body so that the securement parts can be secured together at a plurality of intermediate positions along the body. In this way, the device body can be adapted to fit different users, and/or different body parts of the same user (i.e. wrist, arm, leg, torso).

Preferably, the at least two cooperating securement parts comprise: cooperating ferromagnetic plates; and/or cooperating hook and loop fasteners. Ferromagnetic plates are advantageous because they also conduct electricity so can simultaneously act at the aforementioned electrical contact. The hook and loop fasteners may be Velcro™ strips.

Preferably, the device body comprises a reflective material on its exterior surface, preferably wherein the device body comprises a trim of reflective material. The reflective trim provides yet further visual alert to deter would-be attackers.

Preferably, the device body is an elongated band, preferably wherein the device is configured to be secured around a limb of a user's body, more preferably wherein the device is an armband.

Preferably, the electronic control unit comprises a subscriber identification module (SIM) card to enable communication through a cellular network and/or wherein the electronic control unit is configured to connect to a user device, preferably a smartphone, preferably via Bluetooth™, to enable communication via the user device. Such wireless communication means enable transmission of alert signals to remote devices, for example via an SMS text or via an alert trigger on a corresponding smartphone application.

Preferably, the wearable safely device further comprises a rechargeable battery. The battery powers components of the device, notably the electronic control unit and its components.

According to another aspect of the present invention, there is provided a system comprising: a wearable safety device according to any preceding claim; and a software application for a user device, preferably a smartphone, wherein the software application is configured to broadcast an alert signal: based on a comparison between a planned route input by a user to the software application and data relating to the location of the user device; and/or upon actuation of the alarm trigger.

The software application uses the smartphone hardware (e.g. the smartphone's transmitter and receiver) to broadcast an alert signal to notify others (who might be located remotely from the user of the safety device) of a potential threat to the user. The alert signal is sent either if the user deviates from a planned route (which might be indicative of an attack) or if the alarm trigger is actuated (such as by the user hitting the device as detected by a vibration sensor, or by disconnection of the securement parts of the device). In this way, a user can notify contacts of a potential attack.

The terms "inner" and "outer" faces of the wearable safety device preferably connote the faces of the device which, in use, when the device is secured to a user, respectively face towards and away from the part of the user to which the device is secured.

According to another aspect described herein, there is provided a safety armband comprising: a body providing a waterproof housing for an electronic unit and a body securement means, wherein the body is an elongated form between two ends and the securement means enables one end of the body to secure to a securement part at a plurality of intermediate positions on the body between its ends, so as to wrap around a tubular form, and wherein the electronic unit comprises one or more transceiver means adapted to receive global positioning locational data and transmit global positioning locational data to a remote receiver; an alarm means arranged to provide an audible alert signal; one or more light sources adapted to broadcast illumination from the body; and a local switch means arranged to broadcast a remote alert signal via the transceiver means and a local alert signal via the alarm means.

In this way the armband in use may be envisaged to be wrapped around a user's limb, for example arm, thereby providing an easy to access device.

It may be envisaged that the local switch means comprises an easy to operate sensor for example, wherein the user is required solely to hit the body and such vibrations are passed to the unit, for example wherein the body includes embedded connections thereto.

In some embodiments the securement means comprises hook and loop portions such as Velcro®.

In some embodiments the securement means comprises ferromagnetic means.

In some embodiments the unit comprises a subscriber identification module (SIM) card to enable communication through cellular networking.

In some embodiments the unit comprises intermachine operability such as Bluetooth®. In this way the armband may be operable with a local smartphone or similar, which may be enabled thereby to provide functions for the armband. For example the armband may utilise the smartphone cellular connection in order to send a remote alert signal via the transceiver means. This may be in addition to or alternative of a cellular connection on or in the armband itself. In this way it may be envisaged that the armband may provide an added layer of security in certain circumstances where the user is minded to carry their smartphone.

In some embodiments the unit comprises a rechargeable battery. Such battery may be charged using a universal serial bus (USB) compatible lead.

In some embodiments the switch means comprises a pressure sensor. This may enable the user to easily slap or hit the armband in event of necessity. The pressure sensor may be located with a housing adapted to contain all electronics, so as to easier and more cost-effectively provide a sealed and contained unit. It may be envisaged that such housing may be an enlarged section of the device, well-adapted to providing an easy target for a direct impact so as to activate the sensor in use.

In other embodiments the device may comprise multiple sensors, for example located about the device body and interconnected.

The pressure sensor may be envisaged to extend along a relatively long portion of the armband between its ends.

It may be envisaged that calibration of the sensor is sensitive such as to detect a hit from the user but not be inadvertently activated by a running action. More particularly it may be envisaged that, particularly in embodiments comprising a single sensor located in a housing, that the pressure signature detected by the sensor is analysed to differentiate between general impacts due to running and direct impacts from the user. In this way, the trigger is actuated only in response to a deliberate hit from the user rather than from general impacts due to a running action. To achieve this, the sensor may comprise a slow vibration sensor switch (which is harder to trigger).

It may be envisaged that the sensor is located at the unit. It may be further envisaged that in further embodiments the armband may comprise connections through the armband more generally so as to enable vibrations from elsewhere on the armband to be transmitted to the sensor so that the alarm will be activated by a user hitting any part of the band).

Some embodiments may comprise multiple sensors distributed about the device. For example, wires may run about the device, running through the embedded foam where the device body comprises a sensor in an end part of the body, and another sensor between the ends of the device body, whereby the sensors and wires may be embedded, bonded, or sewn in place. In this way wherever on the outer face the user hits the device it may be envisaged that the impact will be registered.

In some embodiments the switch means controls the illumination means.

In some embodiments the securement means controls the illumination means.

In some embodiments the illumination means illuminates a warning signal on the armband. For example, it may be envisaged that the warning signal may comprise lettering identifying the armband as an alarm, such that a potential attacker or wrongdoer is warned from approaching. The warning signal is extended and/or repeated between the ends such that it may be seen from a plurality of directions.

The armband may be envisaged to be configured to have alert signals selectively activated by switch means comprising a manually activated actuating member for selectively activating either the local and/or the remote alert means.

It may be envisaged that the remote alert means may be connected automatically to the local alert means. It may also be envisaged that the local alert means may be triggered automatically in certain circumstances. An override may be envisaged for the remote alert means to avoid unnecessary remote alerts.

According to a further aspect described herein, there is provided a software application or app for operation on a smartphone or similar networked electronic item, which may provide access to data supplied in use by the armband. For example:

People with the app can create their profiles using their contact information. This will allow users to add their friends to their routes. This will give their friends update notifications along their routes. if they deviate from their route or the alarm is set off, their contacts will be notified of their current location.

The app allows the user to plan their routes using GPS. The app will have route planning options to help keep the user safe. These include the following: ensuring the route has street lighting; choosing a route that is popular with other uses and therefore deemed safer. and also sticking to busier more pedestrianised areas where users will feel safer.

The user will be able to set up time specific notifications to be sent to chosen contacts whilst the user is on their route. The user can also choose to send alerts to their contacts if they deviate from their route by a set distance. An alert is also sent to the user's contacts if the switch means on their armband is set off, the alert also includes a location pin.

In this way the armband of the present disclosure allows activation of the local switch means to broadcast a remote alert signal to predefined contacts, and/or deviation from a pre-defined global positioning locational data route to broadcast a remote alert signal to predefined contacts or persons. Such contacts are envisaged to be equipped with devices connected to cellular networks.

A preferred embodiment of the invention will now be described by way of example only and with reference to the Figures in which:

DESCRIPTION OF SPECIFIC EMBODIMENTS OF THE INVENTION

Figure 1:
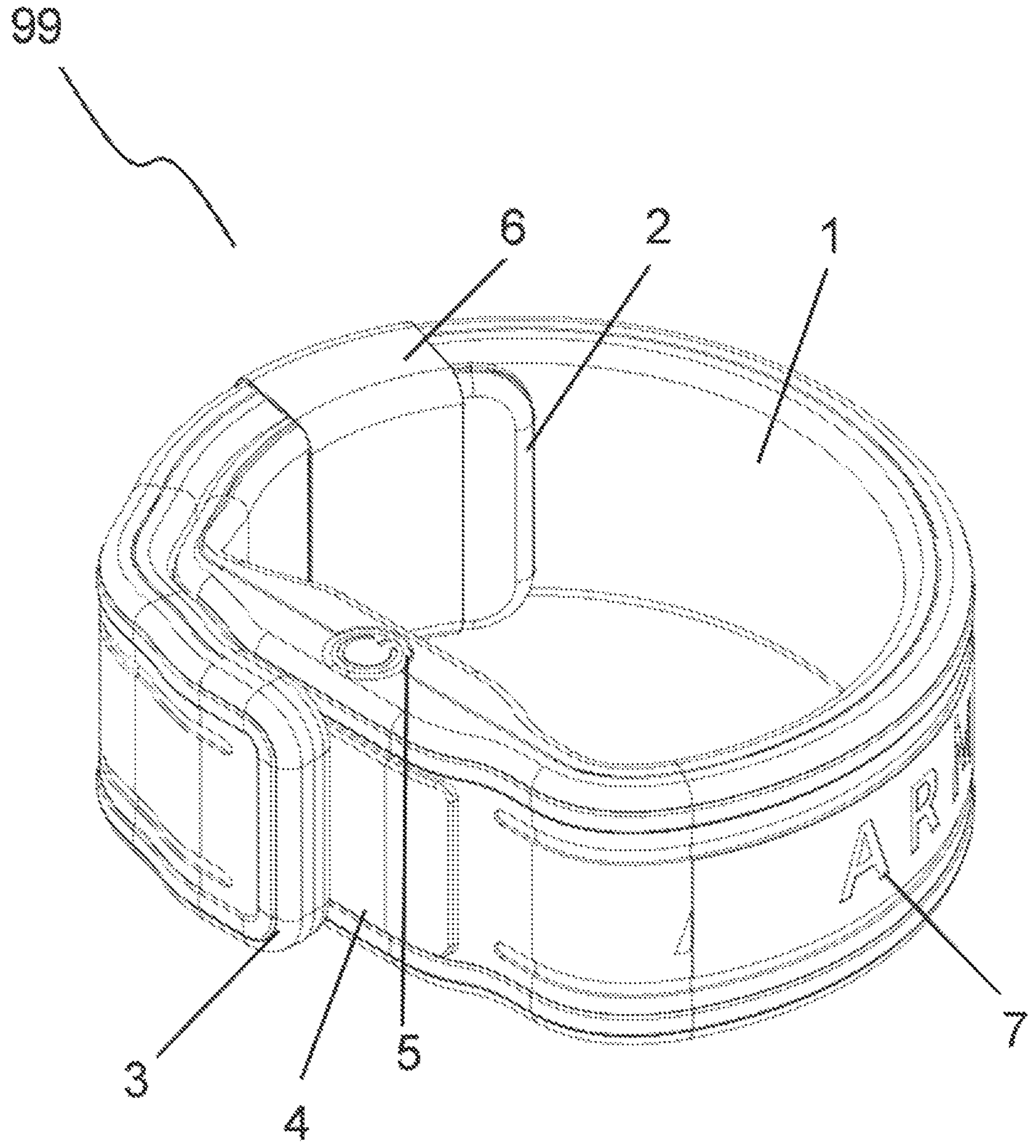
FIG. 1 shows an isometric view of an embodiment of the armband according to the present invention in a secured position.
Figure 2:
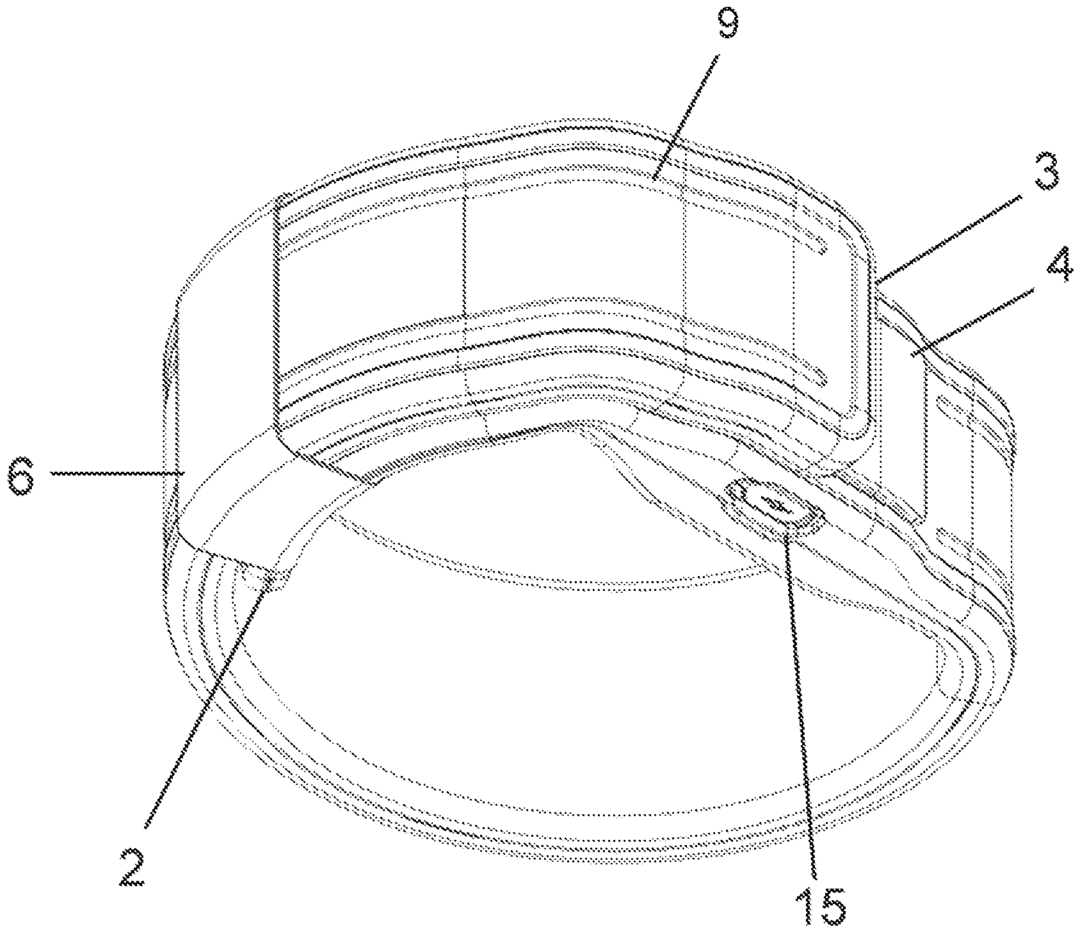
FIG. 2 shows a reverse isometric view of the embodiment of the armband as shown in FIG. 1.
Figure 3:
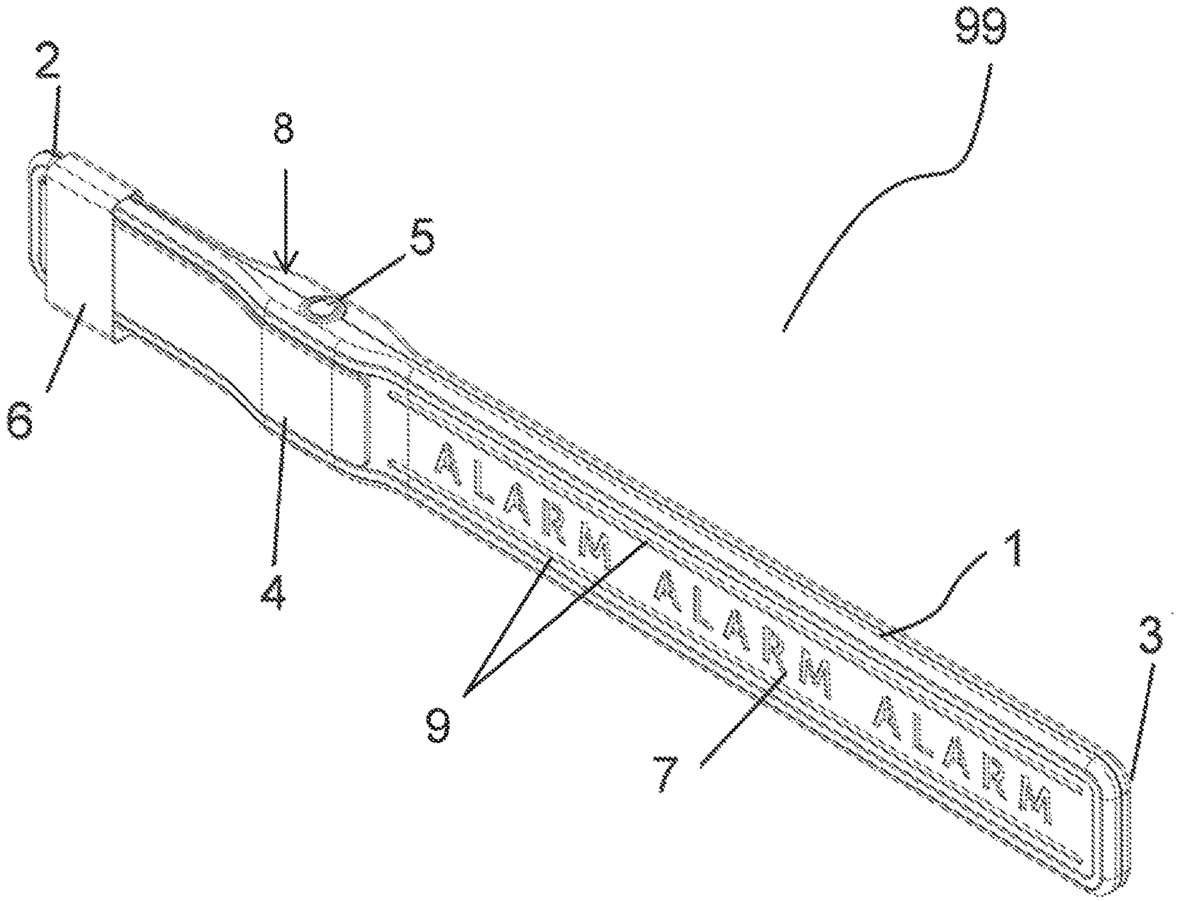
FIG. 3 shows an isometric view of the embodiment of the armband shown in FIG. 1, in an unsecured position.
Figure 4:
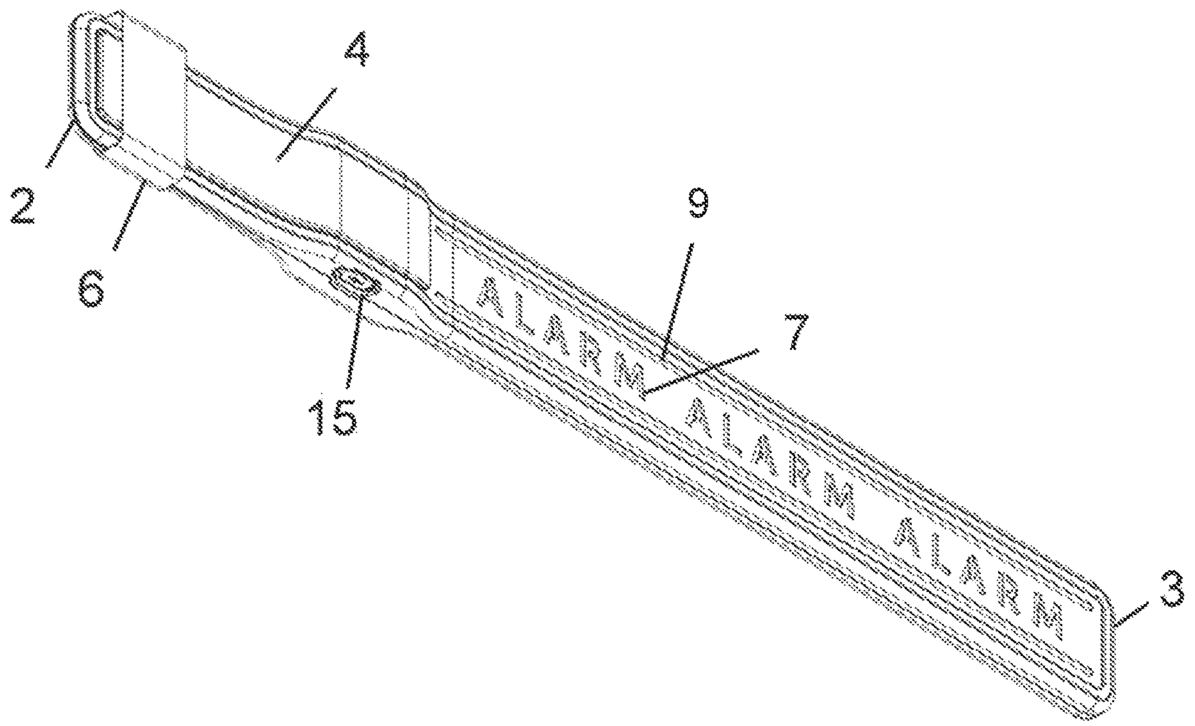
FIG. 4 shows a reverse isometric view of the embodiment of the armband as shown in FIG. 3.

With reference to FIGS. 1 to 4, there is shown an embodiment of the wearable safety device in the form of an armband. FIGS. 1 and 2 show the armband in a secured position, that is as it would be secured to a user's arm, and FIGS. 3 and 4 show the armband in an unsecured position.

The armband 99 comprises an elongate body 1 which extends between two ends 2, 3, and a securement means. The securement means comprises first and second cooperating securement parts 4, 14 located on opposing faces and near opposing ends of the body 1 such that, when the body 1 is wrapped around a user's arm, the securement parts 4, 14 are brought into contact to secure the armband to a user's arm. The first securement part 4 is elongate such that it extends along a portion of the body 1; in this example the first securement part 4 extends along approximately a third of the body 1. In this way, the second securement part 14 can be attached at a plurality of intermediate positions along the length of the first securement part 4 which enables a user to adjust the fit of the armband on their arm.

In this example, the securement parts 4, 14 are cooperating ferromagnetic pads, the first ferromagnetic pad 4 being located on the outer facing side of the armband near the first end 2, and the second ferromagnetic pad 14 being located on the inner facing side of the armband near the second end 3. When the armband is secured to a user's arm, the second ferromagnetic pad 4 secures the second end 3 to the outer face of the body 1. In other examples, the securement parts 4, 14 are cooperating hook and loop portions such as Velcro® pads. The armband also comprises a loop 6 fixed to the body 1 at the first end 2, through which the second end 3 of the body 1 can be threaded when the armband is secured to a user's arm. The loop 6 provides additional security by holding the first end 2 flat against the inner face of the body 1, as shown in FIGS. 1 and 2.

The device body 1 comprises an electronic control unit 51, preferably located in or on the device body 1. The device body 1 also comprises a local alert system, which comprises a light source and an audible alarm, preferably also located in or on the device body 1. The electronic control unit 51 is configured to control the local alert system.

The securement means may comprise an electrical contact between the securement parts 4, 14. The electronic control unit 51 may be configured to detect connection or disconnection of the two securement parts 4, 14 by monitoring the electrical contact (for example monitoring a voltage across the contact). The electronic control means 51 may then control the light source 65 and the audible alarm speaker 35 (the light source and audible alarm, together, being the alarm system) on the basis of the connection between the securement parts 4, 14. In particular, the electronic control unit 51 may be configured to continuously or repeatedly activate the light source 65 while the securement parts 4, 14 are detected to be connected together, so that the warning signal is continually illuminated while the armband is in use. Furthermore, the electronic control unit 51 may be configured and to activate the audible alarm when it is detected that the securement parts 4, 14 have been disconnected by the device was not previous turned off; in this way a siren will be sounded by the speaker 35 in the event that the armband is removed by someone other than the user.

The armband body 1 comprises an enlarged section 8 which houses an electronic control unit (not shown) which is described below. The body 1, in particular the enlarged section 8, provides a waterproof housing for the electronic control unit in order to protect the control unit from the environment. An actuation button 5 is located on top of the enlarged section 8 of the body 1 and is connected to the electronic control unit located within the enlarged section 8. The actuation button 5 is used to operate the electronic control unit as is described below. A charging socket 15 for charging the control unit is located on the bottom of the enlarged section 8 of the body 1. The charging socket 15 has a silicone bung to cover the socket when it is not in use to protect the socket.

The body 1 of the armband has an illuminated warning signal 'ALARM' 7 written three times spaced along the length of the body 1 between the ends. In this example, the warning signal is illuminated by back-lighting of lettering in the body 1 as is described below. In other examples, the warning signal may be provided by LED strips, or similar, arranged to spell a warning pattern or a word such as 'ALARM'. The warning signal provides a visual alert by would-be attackers that the user is carrying the safety device.

In this way, the visual alert provides a deterrent against attacks to improve the safety of the user. Additionally, the armband includes two illuminated or reflective strips 9 running around the border of the body 1 and running longitudinally along the length of the body 1. This reflective trim provides a further visual alert in use which acts as a further deterrent.

Figure 5:
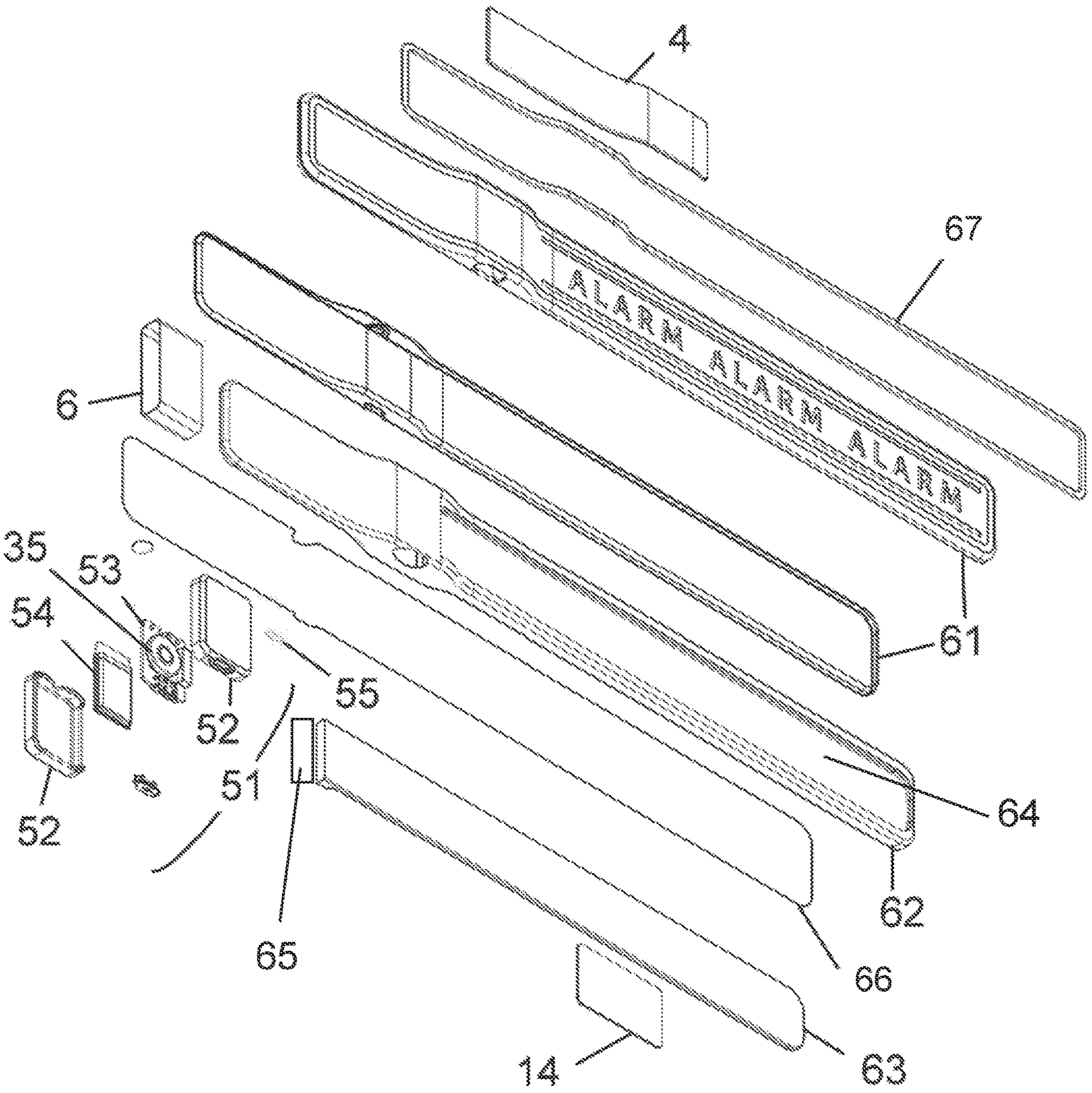
FIG. 5 shows an isometric exploded view of the embodiment of the armband shown in FIG. 4.
Figure 6:
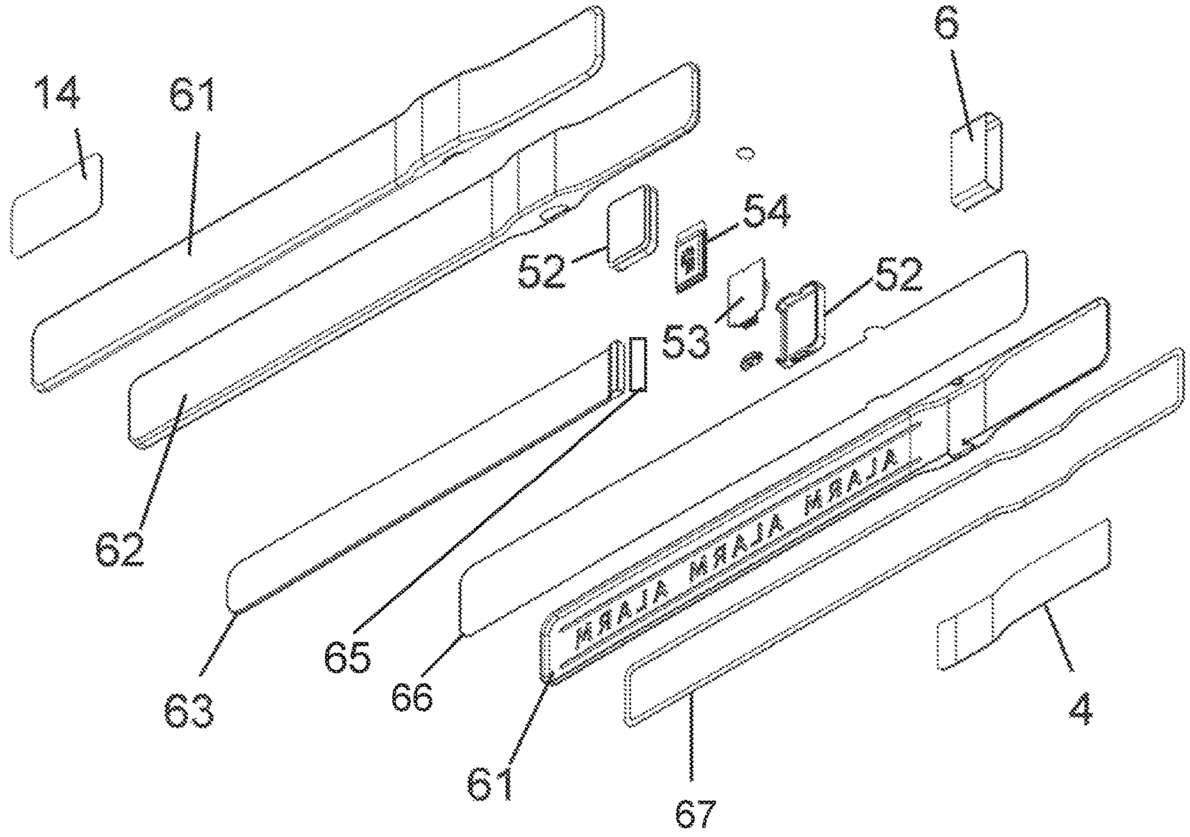
FIG. 6 shows a reverse isometric exploded view of the embodiment of the armband shown in FIG. 3.
Figure 7A:
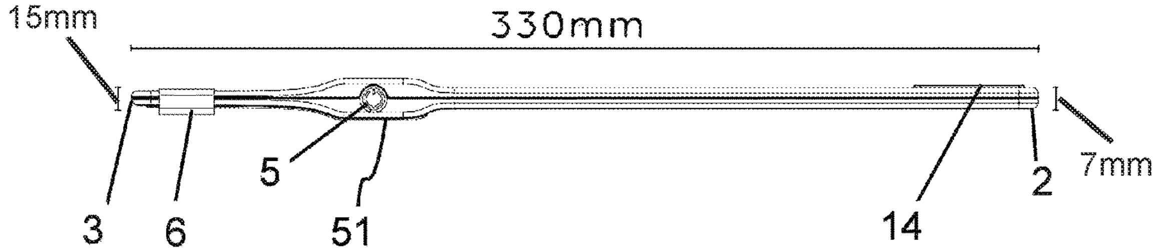
FIGS. 7*a* and 7*b* show top and front views respectively of the embodiment of the armband as shown in FIGS. 3 and 4.
Figure 7B:
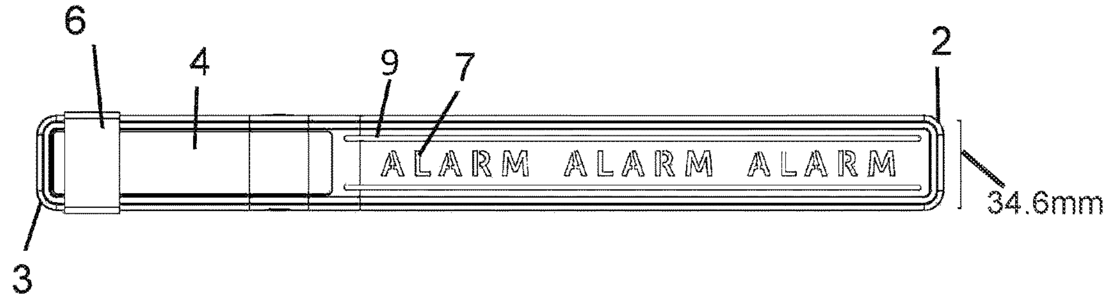

Referring to FIGS. 5 and 6, there is shown exploded views of the armband 99 of FIGS. 1 to 4. The armband comprises a body 1 which can be secured to a user via securement means having first and second securement parts 4, 14 as described above. The body 1 has a loop 6 through which an end of the armband can be threaded when the armband is secured around a user's arm.

The body 1 of the armband comprises an outer sleeve 61 and an inner padding 62. The outer sleeve 61 in this example is formed of two parts attached together; in other embodiments the outer sleeve 61 is formed as a single piece. The inner padding 62 is adapted to fit within the outer sleeve 61 when the armband is assembled, therefore the inner padding 62 is sized and shaped to correspond to the size and shape of the outer sleeve 61. The outer sleeve 61 in this example is made from neoprene which is flexible to ensure that the armband is easy for a user to wrap around their arm and to ensure that all components within the outer sleeve 61 are held in place. The inner padding 62 in this example is made from polyurethane foam which increases comfort for the user. In other examples the inner padding 62 is transparent or translucent to allow illumination from a light source to pass through the inner padding 62.

The two parts of the outer sleeve 61 are joined by stitching 66 and adhesive bonding. The outer sleeve further includes a retroreflective strip 67 which is bonded to the sleeve's outer face. This strip provides a further visual deterrent.

The inner padding 62 has a rectangular cut-out portion 64 that forms a seat for a diffuser panel 63. The diffuser panel 63 in this example is a flexible silicone panel which is shaped to fit within the seat in the inner padding 62. The diffuser panel 63 extends along most of the length of the body 1 of the armband. The diffuser panel 63 is illuminated by a light source 65, which in this example is one or more light emitting diodes (LEDs). The light source 65 is disposed adjacent the diffuser panel 63 such that the diffuser panel 63 is side-illuminated by the light source 65, that is, light from the light source is directed into the diffuser panel 63 through the end of the diffuser panel 63 and along its length. The light diffuser panel 63 diffuses the light from the light source so that the diffuser panel 63 provides a substantially evenly illuminated panel. In this way, the diffuser panel carries light along the length of the armband without the need for an array of light sources distributed along the armband; instead, only a single light source 65 is required to illuminate the length of the armband.

The outer sleeve 61 comprises a warning signal which is illuminated by the light source 65 to provide the visual alert to acts as a deterrent against would-be attackers. In this example, warning signal is provided by cut-out or transparent portions in the outer sleeve 61 which forming lettering to spell 'ALARM'. The light source 65, which illuminates the diffuser panel 63 that is located within the outer sleeve 61 and behind the lettering, provides back-lighting to illuminate the warning signal lettering. The back-lighting of the warning signal is evenly distributed across the warning signal by the diffuser panel 63.

A self-contained electronic control unit 51 is advantageously housed within an enlarged waterproof section 8 of the body 1. The electronic control unit 51 comprises a casing 52 having front and back parts which fit together to encase the other components of the electronic control unit 51. A printed circuit board (PCB) 53 and a battery 54 are provided within the casing 52 to respectively connect together and power the other components of the electronic control unit 51. The electronic control unit 51 comprises a charging socket 15 for charging the battery 54, and a silicone bung (not shown) for covering the socket when it is not in use to protect the socket.

The electronic control unit 51 comprises an alarm trigger, which in this example is a vibration or pressure sensor 55, and an audible alarm which is provided by a speaker 35. The electronic control unit 51 is configured, upon actuation of the alarm trigger, to activate the audible alarm. The alarm trigger is actuated with the vibration or pressure sensor 55 measures a vibration which exceeds a pre-set threshold level. The pre-set threshold level is calibrated such that the level will be exceeded when a user hits the armband but will not be exceeded in the course of a user running with the armband secured to their arm.

In this way, should a user feel threatened, the user may trigger an alarm by hitting the armband, or more particularly the unit, which will be detected by the vibration sensor 55 and actuate the alarm trigger. The electronic control unit 51 will then activate the speaker 35 so as to sound a loud siren through the speaker 35. In additional, the electronic control unit 51 may broadcast a remote alert to pre-set contacts, using a transceiver means, who are thereby made aware of the location of the armband and user, as well as their need for assistance. This mechanism for actuating the alarm is advantageous because it is easy for a user to actuate the alarm even if they are panicked, particularly as compared to existing alarms where a small button (which is hard to locate when panicked) must be pressed to activate an alarm.

In order to ensure that the alarm is triggered upon a hit from a user, the armband may also comprise connections (not shown) within the body 1 of the armband, for example within the inner padding 62 or within the outer sleeve 61, which transmit vibrations to the sensor. The connections preferably run longitudinally along the length of the body 1 to transmit vibrations along the length of the body 1 to the sensor 55. In this way, if a user hits a part of the armband away from the location of the sensor 55, the vibrations from the hit will be transmitted effectively via the connections within the body 1 to the sensor 55 to actuate the alarm trigger and activate the audible alarm. The connections may be formed of a malleable metal such as aluminium which transmits vibrations well and which will not prevent the armband from being secured around a user's arm. Alternatively, the sensor 55 may be chosen to extend along a substantial portion of the length of the body 1 such that a hit on any part of the armband will be detected by the sensor 55 and will actuate the alarm trigger which in turn will activate the audible alarm.

The electronic control unit 51 may be configured such that the alarm trigger is actuated only upon detection of two hits by a user. Similarly, the electronic control unit 51 may be configured with multiple actuation modes, such that a single hit is required to actuate a local alarm (i.e. to activate the speaker 35), and two such hits are required in order for a remote alert signal to be broadcast. In this way false (remote) alarms may be minimised.

The electronic control unit 51 may also be configured to control the light source differently before and after actuation of the alarm; for example, before actuation of the alarm the light source may be controlled to provide a constant low-level visual alert, but after the alarm is actuated the light source may be controlled to provide a maximum brightness flashing visual alert in order to draw further attention to the user. In this way, the visual alert can switch between two functions upon actuate of the alarm: firstly, as a deterrent before actuation of the alarm to warn potential attackers that the user is alarmed; and secondly, as a distress signal after actuation of the alarm, during an attack, to alert others nearby that the user is being attacked.

The electronic control unit 51 is also configured to activate the light source 65 continuously or repeatedly while the armband is in use in order to provide a continuous or repeating illumination of the warning signal. The provides an ongoing visual deterrent to would-be attacks who can see that the user is carrying the safety device. In particular, the electronic control unit 51 is provided with a range of lighting settings from which a user can chose to select the appropriate lighting. For example, the user can select a continuous illumination setting, where the light source 65 will continuously illuminate the warning signal, or a flash setting where the light source will flash frequently to repeatedly illuminate the warning signal. Furthermore, a user can select the brightness of the light to suit the ambient lighting conditions; for example, a bright light might be required during the day, but a dimmer light would be sufficient at night. The user can cycle through these lighting settings by clicking the actuation button 5.

The electronic control unit 51 comprises one or more transceiver means (not shown) adapted to receive global positioning locational data and transmit global positioning locational data to a remote receiver. The transceiver means may be a subscriber identification module (SIM) card to enable communication through a cellular network. Additionally, or alternatively, the electronic control unit may comprise a wireless interface for connecting to a user device, such as a smartphone, for example via Bluetooth™ to enable communication via the user device.

The global positioning locational data relates to a location of the armband. Prior to setting off, for example on a run, the user is enabled by a connected software application to input a route, for example on a connected smartphone or personal computing device, and the armband sends periodic geolocational notifications to a remote monitoring system. The location of the armband and user can therefore be compared to the selected route such that if the location of the armband and user deviates from that route by a predefined scale of distance or unacceptable level of deviation the application will alert pre-selected contacts. The application may also actuate the alarm trigger which will activate the local audible alarm. The user may control the time periods for notifications. The application may be envisaged to include information regarding the route, for example lighting and visibility information, so as to allow planning of a safe route initially. If unacceptable deviation occurs or a remote alert is triggered a geolocational pin will show on the application for the pre-selected contacts.

In use therefore the user will secure the armband around their arm and press and hold the actuation button 5 to turn the device on and press again to cycle through lighting settings, for example intermittency and/or brightness settings. Then if the user feels threatened while wearing the armband, they can slap the device to trigger an audible alarm to provide a local alert as well as a remote alert which notifies their contacts who will get an alert, with an exact geolocational pin.

Alternatives and Modifications

It should be understood what while the figures show an embodiment of the invention in the form of an armband that is wrapped around a user's arm, the invention could equally be embodied by a smaller wearable band adapted to fit around a user's wrist, or around another limb, such as around a user's ankle, or a larger band adapted to be worn around a user's torso. Furthermore, the invention could equally be embodied in the form of another wearable item other than a band, such as a vest.

The invention has been described by way of examples only and it will be appreciated that variation may be made to the above-mentioned embodiments without departing from the scope of invention as defined by the claims, in particular but not solely combination of features of described embodiments.

What is claimed is:

1. A wearable safety device comprising:

a device body adapted to be secured to a user and comprising:

a local alert system comprising at least one light source and an audible alarm; and an electronic control unit comprising an alarm trigger and being configured to control the local alert system, wherein the alarm trigger comprises a multiple vibration or pressure sensors;

wherein the electronic control unit is configured to continuously or repeatedly activate the light source to provide a visual alert, and wherein the electronic control unit is configured, upon actuation of the alarm trigger, to activate the audible alarm, wherein the alarm trigger is actuated upon detection by the vibration or pressure sensors of a pressure signature indicative of a deliberate impact from the user.

2. A wearable safety device according to claim 1, wherein the electronic control unit is further configured to broadcast an alert signal, preferably to predefined contacts, via transceiver means upon actuation of the alarm trigger.

3. A wearable safety device according to claim 1, wherein the electronic control unit is configured to transmit and receive global positioning location data to and from a remote receiver, the data relating to the location of the safety device.

4. A wearable safety device according to claim 3, wherein the electronic control unit is configured to compare the data relating to the location of the safety device to data relating to a planned route, and to broadcast an alert signal via transceiver means, and optionally to activate the audible alarm, based on the comparison.

5. A wearable safety device according to claim 1, wherein the vibration or pressure sensor is calibrated such that the alarm trigger is actuated when a detected vibration exceeds a threshold value.

6. A wearable safety device according to claim 1, wherein the vibration or pressure sensor extends along a length of the device body.

7. A wearable safety device according to claim 1, further comprising connections through the device body adapted to transmit vibrations to the vibration or pressure sensor.

8. A wearable safety device according to claim 1, comprising a diffuser panel, wherein the light source is configured to illuminate the diffuser panel from beside the diffuser panel, preferably wherein the diffuser panel is a silicone panel.

9. A wearable safety device according to claim 8, wherein the device body comprises an outer sleeve, and wherein the at least one light source and the diffuser panel are located within the outer sleeve so that the illuminated diffuser panel provides illumination through the outer sleeve, preferably wherein the outer sleeve comprises cut-out or transparent portions, optionally forming lettering, the at least one light source being adapted to back-light the cut-out or transparent portions.

10. A wearable safety device according to claim 1, wherein the at least one light source is adapted to illuminate a warning signal on the device body to provide the visual alert.

11. A wearable safety device according to claim 1, comprising a securement means for securing the device body to a user, the securement means comprising at least two cooperating securement parts adapted to be connected together.

12. A wearable safety device according to claim 11, wherein the electronic control unit is configured to detect disconnection of the at least two securement parts, and to broadcast an alert signal via transceiver means, and optionally to activate the audible alarm, upon detection of the disconnection.

13. A wearable safety device according to claim 11, wherein the electronic control unit is configured to detect connection of the at least two securement parts, and to activate the at least one light source upon detection of the connection.

14. A wearable safety device according to claim 11, wherein the securement means comprises an electrical contact between the at least two securement parts, and wherein the electronic control unit is configured to detect connection or disconnection of the at least two securement parts by monitoring the electrical contact.

15. A wearable safety device according to claim 11, wherein at least one of the cooperating securement parts extends along a length of the device body so that the securement parts can be secured together at a plurality of intermediate positions along the device body.

16. A wearable safety device according to claim 11, wherein the at least two cooperating securement parts comprise: cooperating ferromagnetic plates; and/or cooperating hook and loop fasteners.

17. A wearable safety device according to claim 1, wherein the device body comprises a reflective material on its exterior surface, preferably wherein the device body comprises a trim of reflective material.

18. A wearable safety device according to claim 1, wherein the device body is an elongated band, preferably wherein the device is configured to be secured around a limb of a user's body, more preferably wherein the device is an armband.

19. A system comprising:

a wearable safety device according to claim 1; and a software application for a user device, preferably a smartphone, wherein the software application is configured to broadcast an alert signal:

based on a comparison between a planned route input by a user to the software application and data relating to the location of the user device; and/or upon actuation of the alarm trigger.

20. A wearable safety device according to claim 1, wherein the multiple vibration or pressure sensors are distributed about at least a section of the device.

* * * * *